(12) United States Patent
Shindo

(10) Patent No.: US 6,542,315 B2
(45) Date of Patent: Apr. 1, 2003

(54) OPTICAL PICK-UP DEVICE

(75) Inventor: Hiroyuki Shindo, Chofu (JP)

(73) Assignee: Teac Corporation, Tokyo (JP)

( * ) Notice: Subject to any disclaimer, the term of this patent is extended or adjusted under 35 U.S.C. 154(b) by 53 days.

(21) Appl. No.: 09/944,606

(22) Filed: Aug. 31, 2001

(65) Prior Publication Data

US 2002/0039343 A1 Apr. 4, 2002

(30) Foreign Application Priority Data

Oct. 3, 2000 (JP) ........................................ 2000-304085

(51) Int. Cl.$^7$ ............................................... G02B 17/00
(52) U.S. Cl. .................... 359/726; 369/112.01
(58) Field of Search ............................ 359/341, 4, 811, 359/813, 814, 819, 822–824, 820, 629, 626, 719, 726; 369/110.01–110.02, 112.01–112.08, 43, 44.11, 44.12

(56) References Cited

U.S. PATENT DOCUMENTS

| | | | | |
|---|---|---|---|---|
| 4,423,495 A | * | 12/1983 | Musha et al. ............ | 369/44.25 |
| 5,062,094 A | * | 10/1991 | Hamada et al. .......... | 369/44.12 |
| 5,081,615 A | * | 1/1992 | Sunagawa ................ | 369/44.12 |
| 5,592,460 A | * | 1/1997 | Shindo ................... | 369/112.29 |

FOREIGN PATENT DOCUMENTS

| | | |
|---|---|---|
| JP | 3189932 | 8/1991 |
| JP | 5120723 | 5/1993 |
| JP | 567918 | 9/1993 |

* cited by examiner

Primary Examiner—Jordan M. Schwartz
Assistant Examiner—Jessica Stuhz
(74) Attorney, Agent, or Firm—Ladas & Parry

(57) ABSTRACT

An optical pick-up device includes a light emitting unit for directing a laser beam onto a storage medium; a reflecting member that reflects the laser beam emitted from the light emitting unit in a direction substantially perpendicular to a storage surface of the storage medium; and a focusing member that focuses the laser beam reflected from the reflecting member onto the storage surface of the storage medium, the light emitting unit being mounted at an angle such that an axis of the laser beam directed onto the reflecting member from the light emitting unit and an axis of the laser beam reflected onto the storage medium form an angle of less than 90 degrees, a position from which the laser beam is emitted from the light emitting unit being provided in a direction closer to the storage surface of the storage medium from a center of the light emitting unit.

5 Claims, 5 Drawing Sheets

OPTICAL PICK-UP DEVICE

BACKGROUND OF THE INVENTION

1. Field of the Invention

The present invention relates generally to an optical pick-up device, and more particularly, to an optical pick-up device constructed so as to reflect and focus light from a light emitting unit onto a storage surface of a storage medium.

2. Description of the Related Art

Optical pick-up devices exist for reading and/or writing information to and from a disk-like rotating storage medium such as, for example, a CD-ROM. The advantages of optical storage and retrieval systems over other types of information storage and retrieval systems have spurred efforts to make such optical pick-up devices slim enough to be incorporated in portable information storage devices, most notably the popular laptop-type personal computer.

An optical pick-up device as described in Japanese Laid-Open Patent Application No. 5-120723 represents a conventional way to reduce the thickness of such optical pick-up devices.

FIG. 1 is a schematic diagram of an optical system of the conventional optical pick-up device as described in Japanese Laid-Open Patent Application No. 5-120723, a printed publication.

As shown in FIG. 1, a read-only optical pick-up device 1 has a light emitting unit 3 that directs a laser beam onto a storage surface 2a of an optical disk storage medium 2 and that picks up the light reflected from the storage surface 2a, a reflecting member (that is, a mirror) 4 tilted at an angle $\theta_0$ with respect to a hypothetical horizontal plane, and a focusing member (that is, an object lens) 5 that focuses the light from the reflecting mirror 4 onto the storage surface 2a of the optical disk storage medium 2. The laser unit 3 that forms a light emitting unit is mounted in a tilted state, at an angle such that a central axis of light L1 of the light emitted from the laser unit 3 and a central axis of light L2 of the light reflected toward the optical disk storage medium 2 together form an angle that is less than 90 degrees.

In such a configuration of the optical pick-up device 1, a distance $H_0$ between the storage surface 2a of the optical disk storage medium 2 and a hypothetical horizontal plane formed by a bottom surface of the reflecting mirror 4 can be reduced and thus the thickness of the optical pick-up device can be reduced, because the position at which the laser unit 3 is mounted is above the hypothetical horizontal plane formed by the bottom surface of the reflecting mirror 4. Even with such a configuration it is still possible to maintain a minimum safe separation distance d between the upper edge of the laser unit 3 and the optical disk storage medium 2, so that there is no danger that the optical disk storage medium 2 will contact an upper edge of the laser unit 3. It should be noted that the above-described distance d is a distance at which there is no danger that the optical disk storage medium 2 will contact the upper edge of the laser unit 3 when the optical disk storage medium 2 is rotatably driven even if there is unevenness in the rotation of the optical disk storage medium 2.

FIG. 2 is a schematic diagram of the optical system of a conventional read-write optical pick-up device.

As shown in FIG. 2, a read-write optical pick-up device 6 interposes a collimator lens 7 between the laser unit 3 and the reflecting mirror 4. The collimator lens 7 refracts the light emitted from the laser unit 3, changing it into parallel rays, such that the parallel rays of light are directed toward the reflecting mirror 4. In such a read-write optical pick-up device 6, the laser unit 3 is mounted at an angle such that an angle formed by an axis L1 of the light emitted from the laser unit 3 and an axis L2 of the laser beam reflected onto the optical disk storage medium 2 by the reflecting mirror 4 form an angle of less than 90 degrees.

As a result, as with the optical pick-up device 1 noted previously, in such a configuration of the optical pick-up device 6 as described above, the distance $H_0$ between the storage surface 2a of the optical disk storage medium 2 and a hypothetical horizontal plane formed by the bottom surface of the reflecting mirror 4 and a bottom surface of the collimator lens 7 can be reduced and thus the thickness of the optical pick-up device can be reduced, because the position at which the laser unit 3 is mounted is above the hypothetical horizontal plane formed by the bottom surface of the reflecting mirror 4 and the bottom surface of the collimator lens 7. Even with such a configuration it is still possible to maintain the minimum safe separation distance d between the upper edge of the laser unit 3 and the optical disk 2, so that there is no danger that the optical disk storage medium 2 will contact an upper edge of the laser unit 3.

In order to facilitate an understanding of the present invention, a description will now be given of the light emitting unit used to generate the laser beam in an optical pick-up device.

FIG. 3 is an enlarged front view of a conventional light emitting unit.

As shown in FIG. 3, a laser unit 3 is composed of an integrated circuit (IC) chip, with a plurality of input/output terminals 8a projecting outward from both lateral surfaces of a unit package 8. A laser diode 9, a reflecting mirror 10 that reflects light emitted from the laser diode 9 at a right angle, and a pair of photodiodes 11 that detect the light reflected from the storage surface of the optical disk storage medium 2 are mounted atop a substrate 8c of the unit package 8. The photodiodes 11 convert the light reflected from the storage surface of the optical disk storage medium 2 into electrical signals.

Additionally, the laser unit 3 is configured so that the mirror 10 is provided at a center of the unit package 8. Accordingly, a point of emission of the light emitted from the laser unit 3 coincides with a hypothetical perpendicular line passing through the center position of the mirror 10.

FIG. 4 is a schematic diagram of a conventional optical system, illustrating a conventional solution to the problem of how to reduce the thickness of a read-only optical pick-up device. FIG. 5 is a schematic diagram of a conventional optical system, illustrating a conventional solution to the problem of how to reduce the thickness of a read-write optical pick-up device.

As shown in FIG. 4 and FIG. 5, the conventional solution to the problem of how to reduce the thickness of the optical pick-up devices described above is to mount the laser unit 3 in a tilted state and to reduce the angles of inclination $\theta_0$, $\theta_1'$ of the reflecting mirror 4 to smaller angles $\theta_0'$, $\theta_1'$, thus allowing the distance (that is, the thickness of the optical system) $H_0$, $H_1$ to be reduced to $H_0'$, $H_1'$.

It should be noted the read-write optical pick-up device 6 described above, for example, specific values for the angles and distances involved are as follows:

$\theta_0'$=43.6 degrees;

$\theta_1'$=42.788 degrees;

$H_0' = 7.46$ mm; and $H_1' = 7.36$ mm, with the result that the thickness of the device can be reduced by approximately 0.1 mm.

However, there is a problem with the conventional solution, in that the minimum safe separation distance d between an upper edge 8b of the unit package 8 of the laser unit 3 and the optical disk storage medium 2 cannot be maintained, because the mirror 10 which reflects the light from the laser unit 3 onto the storage surface 2a of the optical disk storage medium 2 is positioned at the center of the unit package 8 of the laser unit 3.

As a result, there is a danger that the optical disk storage medium 2 will contact the upper edge 8b of the laser unit 3, and accordingly, there is a limit to the extent to which the thickness of the optical pick-up device can be reduced in the conventional art.

SUMMARY OF THE INVENTION

Accordingly, it is an object of the present invention to provide an improved and useful optical pick-up device in which the above-described disadvantage is eliminated.

The above-described object of the present invention is achieved by an optical pick-up device comprising:

a light emitting unit for directing a laser beam onto a storage medium;

a reflecting member that reflects the laser beam emitted from the light emitting unit in a direction substantially perpendicular to a storage surface of the storage medium; and a focusing member that focuses the laser beam reflected from the reflecting member onto the storage surface of the storage medium, the light emitting unit being mounted at an angle such that an axis of the laser beam directed onto the reflecting member from the light emitting unit and an axis of the laser beam reflected onto the storage medium form an angle of less than 90 degrees, a position from which the laser beam is emitted from the light emitting unit being provided in a direction closer to the storage surface of the storage medium from a center of the light emitting unit.

According to the above-described invention, locating the position from which the laser beam is emitted from the light emitting unit being provided in a direction closer to the storage surface of the storage medium from a center of the light emitting unit, as opposed to locating the point of emission of the laser beam from the light emitting unit at the center of the light emitting unit as in the conventional art, allows the light emitting unit to be mounted at a relatively low position as compared to the conventional art even when the degree of tilt with which the light emitting unit is mounted is increased, thus allowing the thickness of the optical pick-up device to be reduced.

Additionally, the above-described objects of the present invention are also achieved by the optical pick-up device as described above, wherein the light emitting unit comprises a light source that emits light, a reflecting mirror that reflects the light from the light source in a direction of a predetermined angle, and a photosensitive element that detects light reflected from a storage surface of a storage medium.

According to the above-described invention, the configuration of the optical pick-up device can be made compact.

Additionally, the above-described objects of the present invention are also achieved by the optical pick-up device as described above, wherein the reflecting mirror is provided at a position displaced upward a predetermined distance from a center of the light emitting unit.

According to the above-described invention, a mounting position in a vertical direction of the light emitting unit can be lowered, thus allowing the thickness of the optical pick-up device to be reduced.

Additionally, the above-described objects of the present invention are also achieved by the optical pick-up device as described above, wherein the light emitting unit is positioned so as to maintain a height position separated a predetermined distance (d) from an upper edge of the storage medium.

According to the above-described invention, the storage medium can be prevented from contacting the upper edge of the laser unit even if there is unevenness in the rotation of the storage medium at high rotation speed.

Additionally, the above-described objects of the present invention are also achieved by the optical pick-up device as described above, wherein a collimator lens that aligns the light emitted from the light unit in parallel rays is provided between the light emitting unit and the reflecting member.

According to the above-described invention, the light emitting unit can be mounted at a relatively low position even in the case of an optical pick-up device that writes and reads information to and from a storage medium and the angle of inclination of the reflecting member is reduced and the angle of inclination of the light emitting unit is increased, thus allowing the thickness of the optical pick-up device to be reduced.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A detailed description will now be given of an improved optical pick-up device according to the present invention, with reference to the accompanying drawings. It should be noted that, for ease of description, identical or corresponding elements are given identical or corresponding reference numbers in all drawings, with detailed descriptions thereof given once and thereafter omitted.

Figure 1:
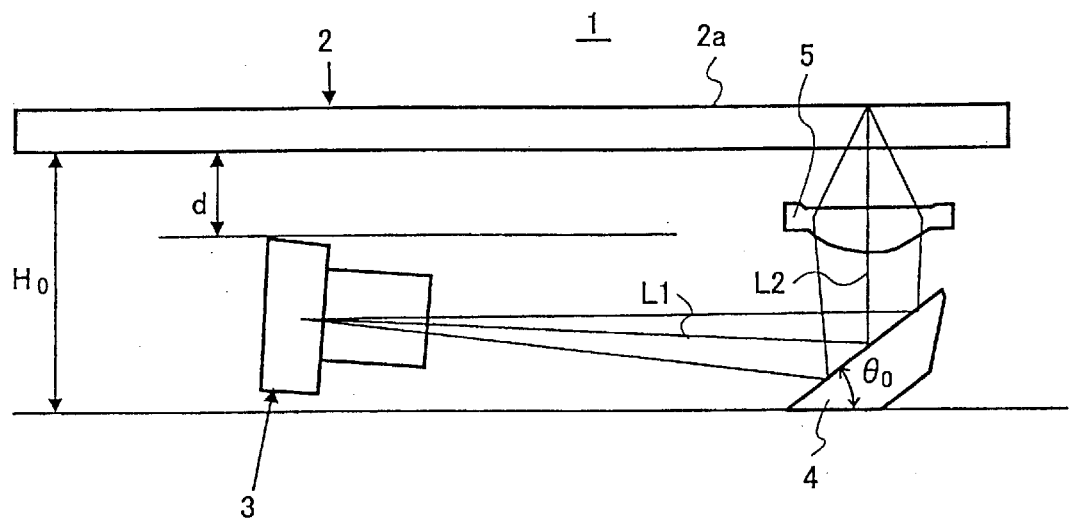
FIG. 1 is a schematic diagram of an optical system of a conventional optical pick-up device as described in a printed publication.
Figure 2:
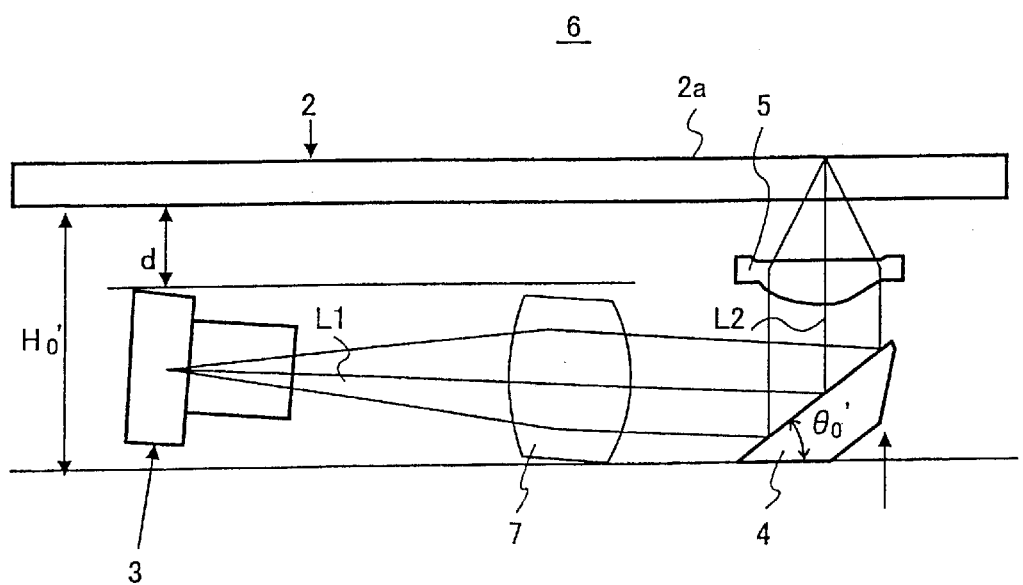
FIG. 2 is a schematic diagram of the optical system of a conventional read-write optical pick-up device.
Figure 3:
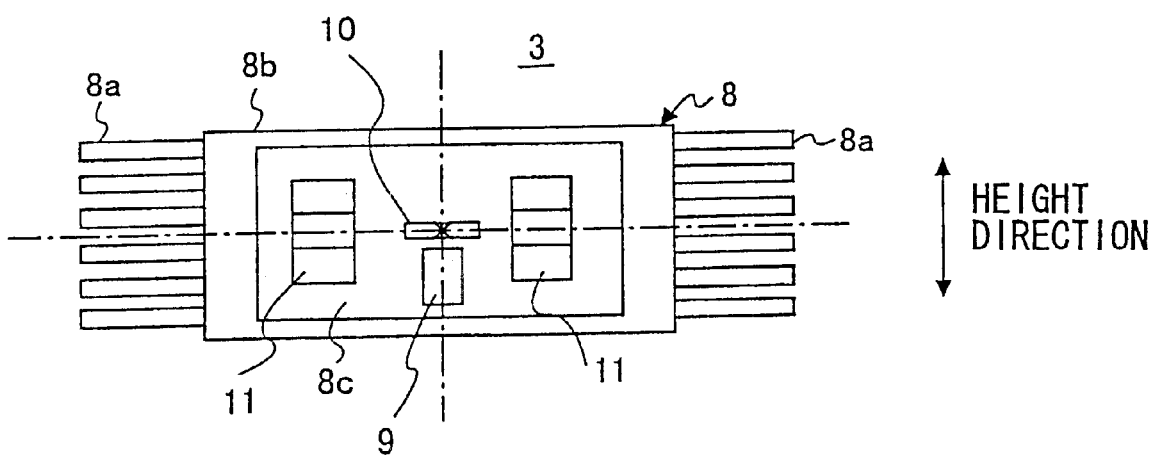
FIG. 3 is an enlarged front view of a conventional light emitting unit.
Figure 4:
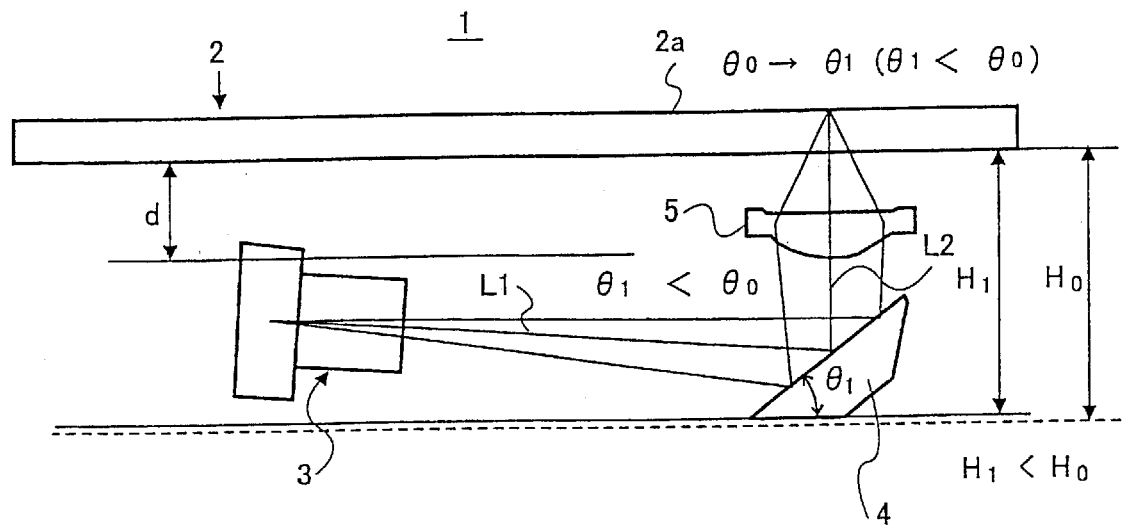
FIG. 4 is a schematic diagram of a conventional optical system, illustrating a conventional solution to the problem of how to reduce the thickness of a read-only optical pick-up device.
Figure 5:
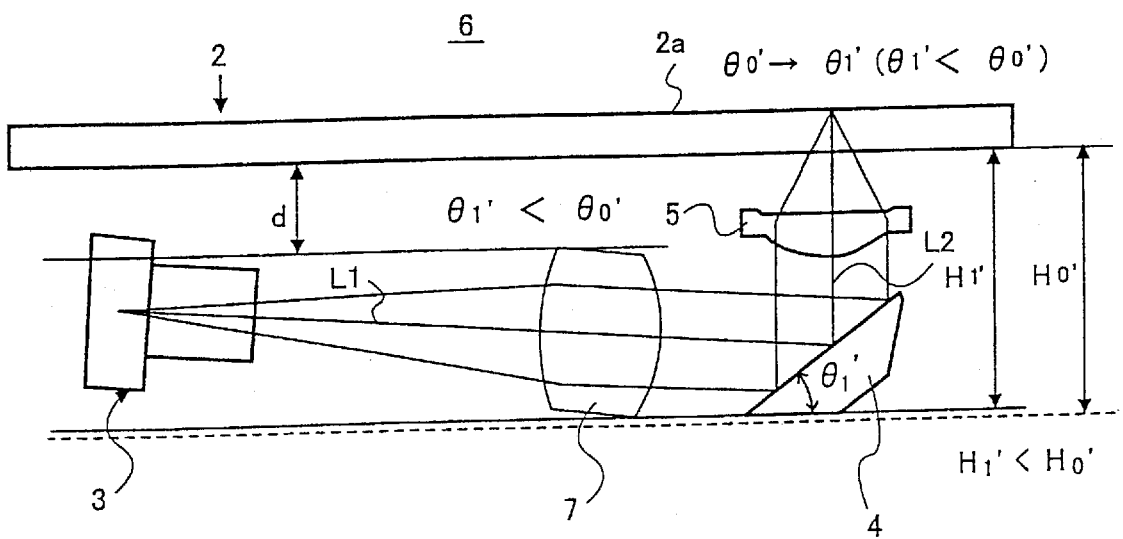
FIG. 5 is a schematic diagram of a conventional optical system, illustrating a conventional solution to the problem of how to reduce the thickness of a read-write optical pick-up device.
Figure 6A:
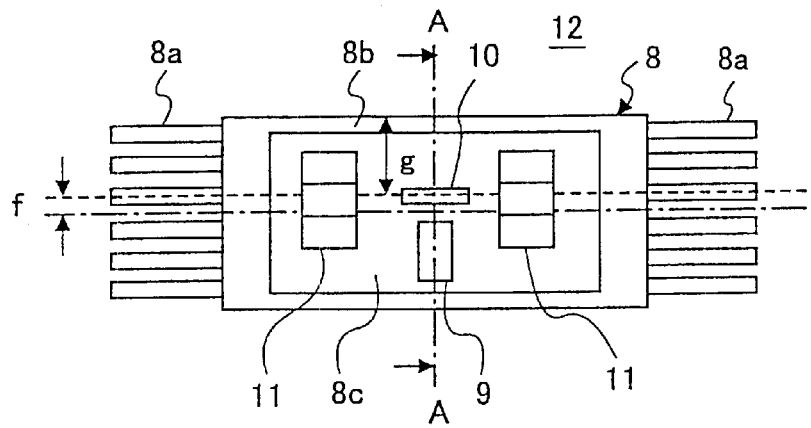
FIGS. 6A, 6B and 6C are front, lateral and cross-sectional views (the last along a line A—A in FIG. 6A), respectively, of a light emitting unit incorporating an optical pick-up device according to one embodiment of the present invention.
Figure 6B:
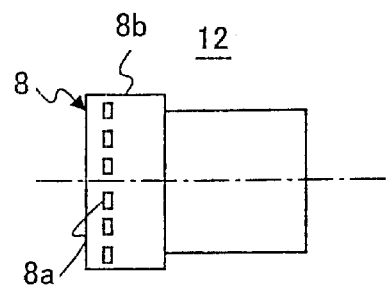
Figure 6C:
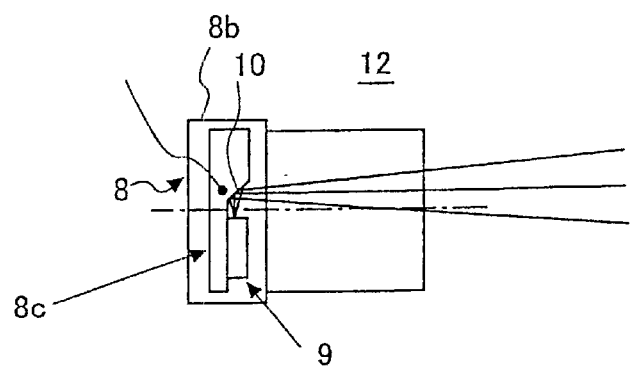

FIGS. 6A, 6B and 6C are front, lateral and cross-sectional views (the last along a line A—A in FIG. 6A), respectively, of a light emitting unit incorporating an optical pick-up device according to one embodiment of the present invention.

As shown in FIGS. 6A, 6B and 6C, in a laser unit 12 the positions of the mirror 10 and the pair of photodiodes 11 are displaced upward by a distance f from a center of the unit package 8, that is, in a direction of the optical disk storage medium 2. Accordingly, a distance g from the mirror 10 to the upper edge 8b of the unit package 8 is reduced by such distance f over the conventional optical pick-up device.

As a result, the laser unit 12 has a thickness from the point of light emission to the upper edge 8b of the unit package 8 of the laser unit 12 that is smaller than the thickness of the conventional laser unit 12 by an amount equivalent to the distance f, thus allowing the position at which the laser unit 12 is mounted to be lowered by an equivalent amount and the angle of inclination of the reflecting mirror 4 to be reduced so the minimum safe separation distance d between the upper edge 8b of the unit package 8 of the laser unit 12 and the optical disk storage medium 2 can still be maintained even as the thickness of the optical pick-up device overall is reduced.

Figure 7:
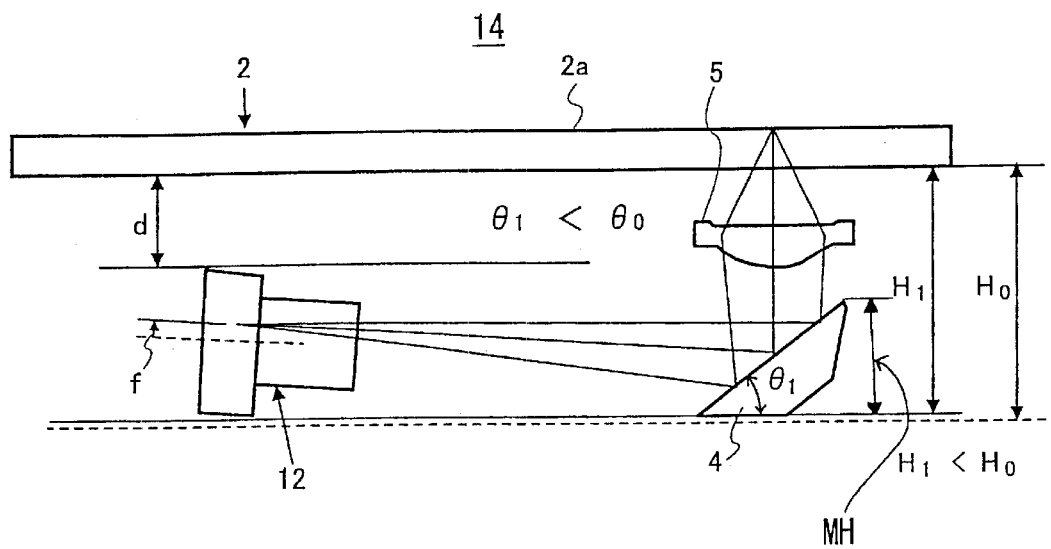
FIG. 7 is a schematic diagram of an optical system of an optical pick-up device according to one embodiment of the present invention.

FIG. 7 is a schematic diagram of an optical system of an optical pick-up device according to one embodiment of the present invention.

As shown in FIG. 7, in a read-only optical pick-up device 14, a height position of the mirror 10 of the laser unit 12 is displaced upward from the center of the unit package 8 by a distance f, so a point of emission of the light from the laser unit 12 is similarly shifted upward as well, thus allowing the angle at which the mirror 10 is mounted to be reduced by an equivalent amount. As a result, the minimum safe separation distance d between the upper edge 8b of the unit package 8 of the laser unit 12 (and thus ultimately of the laser unit 12 itself) and the optical disk storage medium 2 can be maintained. As a result, the upper edge of the laser unit 12 can be prevented from contacting the optical disk storage medium 2 even when there is unevenness in the rotation of the optical disk storage medium 2 at high speed.

Additionally, the amount f by which the above-described mirror 10 of the laser unit 12 is displaced upward from the center of the laser unit 12 is determined by the angle of inclination of the reflecting mirror 4. The lower edge of the laser unit 12 is set so that such edge does not project in a downward direction beyond the lower edge of the reflecting mirror 4.

Thus, with the angle of inclination of the reflecting mirror 4 reduced so as to allow a reduction in the thickness of the optical pick-up device in the vicinity of the reflecting mirror 4, and with the position from which light is emitted from the laser unit 12 (the height position of the mirror 10) displaced a distance f upward from the center of the unit package 8 of the laser unit 12, the upper edge 8b of the unit package 8 of the laser unit 12 (and thus ultimately of the laser unit 12 itself) can be prevented from approaching closer than the distance d to the optical disk storage medium 2 (that is, the distance at which there is no danger that the upper edge of the laser unit 12 will contact the optical disk storage medium 2 even if there is unevenness in the rotation of the optical disk storage medium 2). As a result, the position at which the upper edge 8b of the unit package 8 of the laser unit 12 is mounted can be reduced and the angle $\theta_0$ at which the reflecting mirror 4 is tilted can be reduced to a smaller angle $\theta_1$, thus allowing a height MH of the reflecting mirror 4 to be reduced as compared to the conventional art and thereby also allowing the thickness of the optical pick-up device to be reduced.

As described above, by using a laser unit 12 in which the position at which light is emitted from the laser unit 12 is shifted upward, the angle at which the reflecting mirror 4 is tilted can be reduced and thus the height MH of the reflecting mirror 4 can be reduced, thus allowing the distance (thickness) from a hypothetical horizontal plane formed by the bottom surface of the reflecting mirror 4 to the optical disk storage medium 2 to be reduced from $H_0$ to a smaller $H_1$. The result is that the thickness of the optical pick-up device 14 can be reduced as well.

Figure 8:
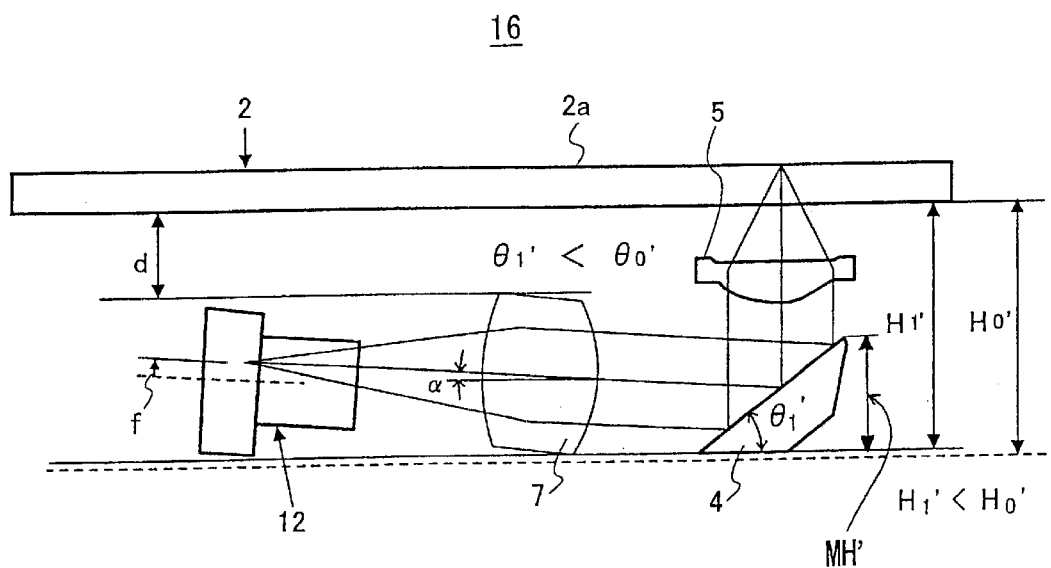
FIG. 8 is a schematic diagram of the optical system of a read-write optical pick-up device according to one embodiment of the present invention.

FIG. 8 is a schematic diagram of the optical system of a read-write optical pick-up device.

As shown in FIG. 8, a read-write optical pick-up device 16 interposes a collimator lens 7 between the laser unit 3 and the reflecting mirror 4. The collimator lens 7 refracts the light emitted from the laser unit 3, changing it into parallel rays, such that the parallel rays of light are directed toward the reflecting mirror 4.

As shown in FIG. 8, in the read-write optical pick-up device 16, a height position of the mirror 10 of the laser unit 12 is displaced upward from the center of the laser unit 12 by a distance f, so a point of emission of the light from the laser unit 12 is similarly shifted upward as well, thus allowing the angle at which the mirror 10 is mounted to be reduced by an equivalent amount. As a result, the minimum safe separation distance d between the upper edge 8b of the unit package 8 of the laser unit 12 (and thus ultimately of the laser unit 12 itself) and the optical disk storage medium 2 can be maintained.

Further, the collimator lens 7 is mounted so as to be tilted at an angle $\alpha$ corresponding to the relative positions of the laser unit 12 and the reflecting mirror 4.

Moreover, the angle $\theta_0'$ at which the reflecting mirror 4 is tilted can be reduced to a smaller angle $\theta_1'$, thus allowing a height MH' of the reflecting mirror 4 to be reduced as compared to the configuration shown in FIG. 7 and thereby also allowing the thickness of the optical pick-up device to be reduced.

As described above, by using a laser unit 12 in which the position at which light is emitted from the laser unit 12 is shifted upward, the angle at which the reflecting mirror 4 is tilted can be reduced and thus the height MH' of the reflecting mirror 4 can be reduced, thus allowing the distance (thickness) from a hypothetical horizontal plane formed by the bottom surface of the reflecting mirror 4 to the optical disk storage medium 2 to be reduced from $H_0'$ to a smaller $H_1'$. The result is that the thickness of the optical pick-up device 14 can be reduced as well.

Additionally, in the case of the read-write optical pick-up device 16 described above, the distance f by which the mirror 10 is displaced upward is determined by the angle of inclination of the reflecting mirror 4, and is set so that either the lower edge of the laser unit 12 does not project downward beyond the lower edge of the reflecting mirror 4, or the lower edge of the laser unit 12 does not project downward beyond the lower edge of the collimator lens 7, or both. Moreover, the value of f is set so that the lower edge of the laser unit 12 does not permit the upper edge of the collimator lens 7 to separate by more than the predetermined distance d from a lower surface of the optical disk storage medium 2 (d being a distance at which there is no danger that the upper edge of the laser unit 12 will contact the optical disk storage medium 2 even if there is unevenness in the rotation of the optical disk storage medium 2).

As can be appreciated by those of ordinary skill in the art, although the present invention has been described with reference to read-write optical pick-up devices or read-only optical pick-up devices for reading information recorded on a CD-ROM, the present invention is not limited to such embodiments but is also adaptable to optical pick-up devices for reading and/or writing information to and from other types of optical disk storage media as well.

The above description is provided in order to enable any person of ordinary skill in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-304085 filed on Oct. 3, 2000, the entire contents of which are hereby incorporated by reference.

What is claimed is:

1. An optical pick-up device comprising:

a light emitting unit for directing a laser beam onto a storage medium;

a reflecting member that reflects the laser beam emitted from the light emitting unit in a direction substantially perpendicular to a storage surface of the storage medium; and a focusing member that focuses the laser beam reflected from the reflecting member onto the storage surface of the storage medium, the light emitting unit being mounted at an angle such that an axis of the laser beam directed onto the reflecting member from the light emitting unit and an axis of the laser beam reflected onto the storage medium form an angle of less than 90 degrees, a position from which the laser beam is emitted from the light emitting unit being provided in a direction closer to the storage surface of the storage medium from a center of the light emitting unit.

2. The optical pick-up device as claimed in claim 1, wherein the light emitting unit comprises a light source that emits light, a reflecting mirror that reflects the light from the light source in a direction of a predetermined angle, and a photosensitive element that detects light reflected from a storage surface of a storage medium.

3. The optical pick-up device as claimed in claim 1, wherein a reflecting mirror is provided at a position displaced upward a predetermined distance from a center of the light emitting unit.

4. The optical pick-up device as claimed in claim 1, wherein the light emitting unit is positioned so as to maintain a height position separated a predetermined distance (d) from an upper edge of the storage medium.

5. The optical pick-up device as claimed in claim 1, wherein a collimator lens that aligns the light emitted from the light unit in parallel rays is provided between the light emitting unit and the reflecting member.

* * * * *